US008052106B2

(12) United States Patent
Knudsen

(10) Patent No.: US 8,052,106 B2
(45) Date of Patent: Nov. 8, 2011

(54) FOLDABLE WORKBENCH

(76) Inventor: N. Eric Knudsen, Maple Valley, WA (US)

( * ) Notice: Subject to any disclaimer, the term of this patent is extended or adjusted under 35 U.S.C. 154(b) by 86 days.

(21) Appl. No.: 12/507,303

(22) Filed: Jul. 22, 2009

(65) Prior Publication Data

US 2010/0018442 A1 Jan. 28, 2010

Related U.S. Application Data

(60) Provisional application No. 61/082,737, filed on Jul. 22, 2008, provisional application No. 61/109,445, filed on Oct. 29, 2008.

(51) Int. Cl.
*F16M 11/24* (2006.01)

(52) U.S. Cl. .................. 248/188.3; 248/170; 248/188.1; 248/188.8; 248/439

(58) Field of Classification Search .................. 248/439, 248/172, 173, 188.1, 166, 165, 168, 170; 403/350, 409.1; 108/99
See application file for complete search history.

(56) References Cited

U.S. PATENT DOCUMENTS

| | | | | | |
|---|---|---|---|---|---|
| 3,566,856 | A | * | 3/1971 | Linstead | 126/25 R |
| 5,096,019 | A | * | 3/1992 | Kelsay | 182/155 |
| 5,340,066 | A | * | 8/1994 | Ditch | 248/170 |
| 5,839,706 | A | * | 11/1998 | Liu | 248/188 |
| 6,032,908 | A | * | 3/2000 | Hillstrom et al. | 248/158 |

OTHER PUBLICATIONS

Wooden workbench, as illustrated in the enclosed photo taken by the Inventor between Jul. 1, 2008, and Jul. 21, 2008.
"5' Workbench Kit Assembly Instructions", Keystone Workbench, Universal Forest Products Inc., www.keystoneworkbench.com, 1 pg., 2008.
"19-W2525—Space Saver Workbench", Jim Barry's Woodworkersworkshop.com, http://www.woodworkersworkshop.com/store/Space_Saver_Workbench, 2 pgs., downloaded Aug. 19, 2009.
"Foldable Woodwork Bench", Jim Barry's Woodworkersworkshop.com, http://www.woodworkersworkshop.com/resources/index.php?search=folding%20workbench, 7 pgs., downloaded Aug. 19, 2009.

* cited by examiner

*Primary Examiner* — Amy Sterling
(74) *Attorney, Agent, or Firm* — Seed IP Law Group PLLC

(57) ABSTRACT

A folding workbench includes a rectangular benchtop frame and first and second leg assemblies pivotably coupled to the frame. Each leg assembly includes first and second legs coupled to respective side rails of the frame, the leg assembly rotatable between a folded position, in which the leg assembly lies substantially within the benchtop frame, and an open position in which the leg assembly extends from the benchtop frame at about a 90 degree angle. Each leg assembly includes a shelf bracket extending between the first and second legs, with a notch extending lengthwise in the shelf bracket. With the leg assemblies in their open positions, a shelf assembly extends between and engages the notches of the shelf brackets, preventing rotation of the leg assemblies away from their open positions. Ends of the legs can be shaped to bind against the frame at selected positions, to provide detents to hold the leg assemblies in their folded or open positions.

7 Claims, 7 Drawing Sheets

FOLDABLE WORKBENCH

CROSS-REFERENCE TO RELATED APPLICATION

This application claims the benefit under 35 U.S.C. §119 (e) of U.S. Provisional Patent Application No. 61/082,737, filed Jul. 22, 2008; and U.S. Provisional Patent Application No. 61/109,445, filed Oct. 29, 2008, where these two provisional applications are incorporated herein by reference in their entireties.

BACKGROUND

1. Technical Field

The embodiments of the present disclosure relate generally to a prefabricated workbench, and in particular, to a workbench that is foldable into a compact package for storage and transport, and that is assembled, in part, by unfolding legs from beneath the bench top.

2. Description of the Related Art

Hardware and garden stores often offer inexpensive folding workbenches for sale, typically made of wood that can be purchased and assembled for use in a shop or garden. Simplicity and ease of assembly vary according to the particular design, in some cases requiring significant effort and skill for successful assembly.

DETAILED DESCRIPTION

Figure 1:
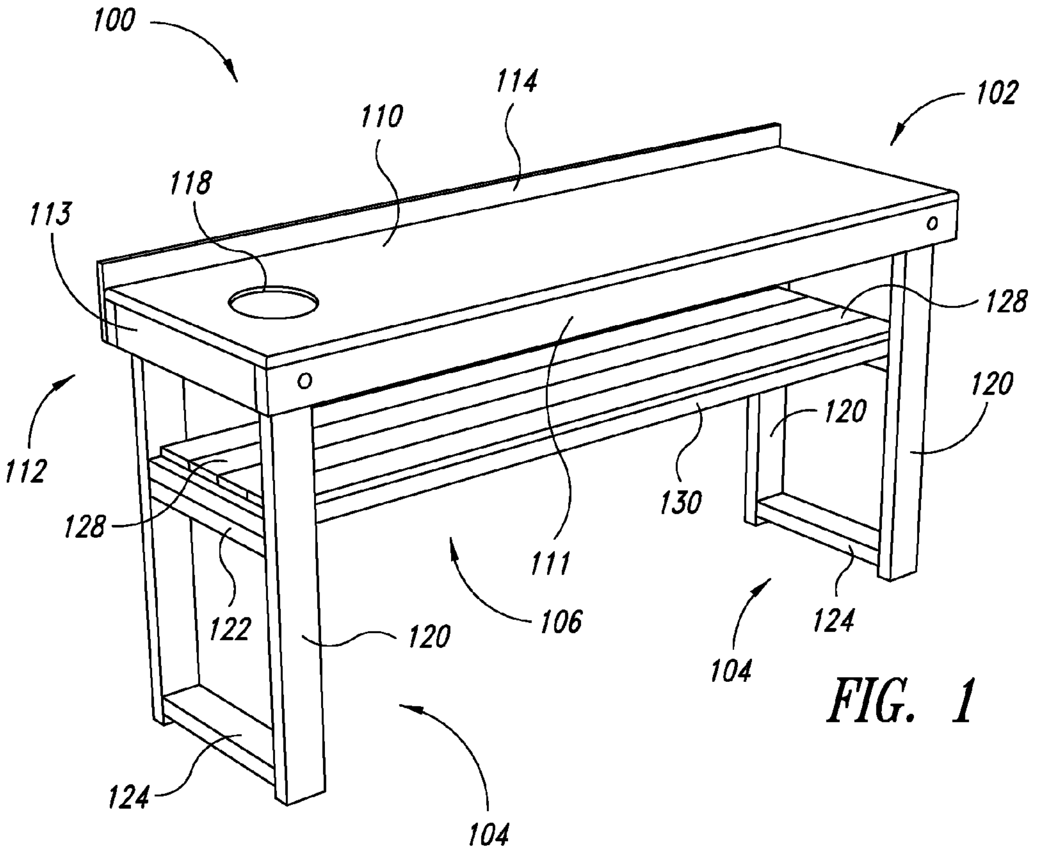
FIGS. 1-6 show perspective views of a prefabricated foldable workbench according to an embodiment, at various stages of assembly.

FIG. 1 shows a prefabricated foldable workbench 100 according to an embodiment. The workbench 100 comprises a benchtop assembly 102, first and second leg assemblies 104, and a shelf assembly 106. The workbench 100 is configured to be transported and sold as a compact package, and to be assemblable without the need for tools.

Figure 2:
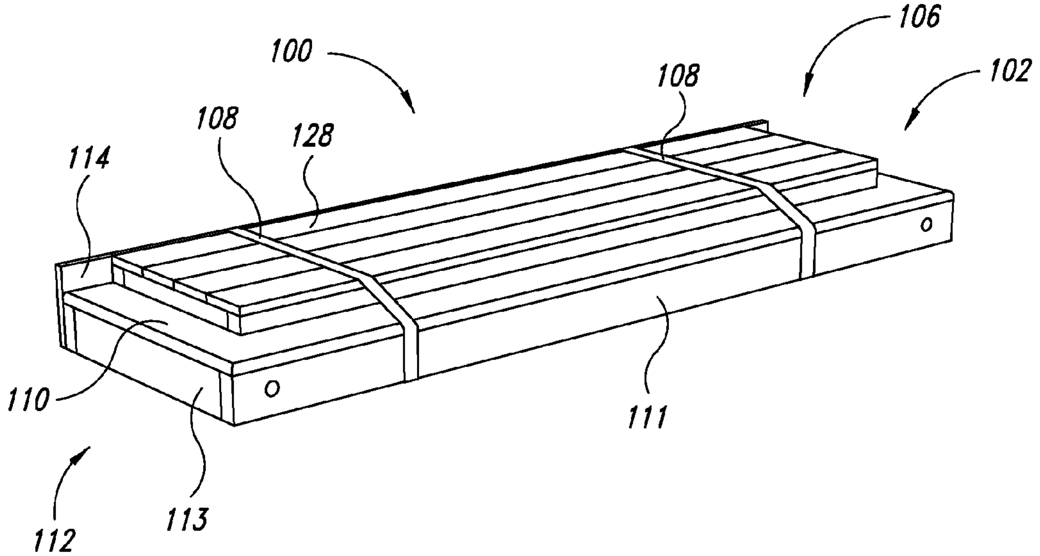

FIG. 2 shows the workbench 100 in the compact package form, in which the shelf assembly is positioned over the benchtop assembly 102, and the first and second leg assemblies 104 are folded into the benchtop assembly 102, the entire package held together, in the embodiment shown, by two steel or plastic strapping bands 108. Apart from the strapping bands themselves, the only additional packaging required is a plurality of cardboard pads positioned between the strapping bands and the components at edges where pressure from the bands might otherwise cause damage to the workbench. Additionally, a page can be provided with material such as assembly instructions, marketing information, retail SKU number, etc., if desired. All of the packaging material can be made to be recyclable.

The benchtop assembly comprises an upper surface plate 110 coupled to a benchtop frame 112, and a back-guard 114 extending a short distance above a top of the plate along its entire length. In the embodiment shown, the benchtop frame 112 is a rectangular frame including first and second side rails 111 lying parallel to each other and in a common plane, and first and second end rails 113 extending between, and coupled to, respective ends of the first and second side rails.

The upper surface plate 110 can be made from any of a wide range of materials, including planks of natural wood, plywood, composite material, hardboard, masonite, medium density fiberboard (MDF), particle board, oriented strand board (OSB), etc. Selection of the material of the upper surface plate 110, as well as the materials used for other components of the workbench, can be influenced by a number of factors, including cost, availability, durability, workability, strength, finish, weight, appearance, environmental impact, etc., according to the intended end user and use. In one embodiment, the upper surface plate is made from MDF, while the remaining components of the workbench 100, except the fasteners, are made from hemlock. According to another embodiment in which the workbench is configured for use as a gardening/potting bench, all of the components, excepting fasteners, are made from cedar.

Additionally, the upper surface plate 110 can be provided with specific details to suit particular applications. For example, where the workbench is configured for use as a potting bench, one or more cutouts can be provided for waste disposal, either to receive a waste pan insert, or to permit passage of waste matter to a receptacle positioned below. According to another embodiment, one or more cutouts in the form of tool wells are provided in the upper surface plate, into which the user can place selected tools to be near at hand while working at the workbench. Such tool wells can be made by removing a portion of the thickness of the upper surface plate 110, or, alternatively, by providing cutouts that extend through the entire thickness of the upper surface plate, and positioning additional material over the cutouts on the lower surface of the plate, so that the depth of the tool wells is equal to the thickness of the upper surface plate. If additional material is to be fastened to the lower surface, the size and position of each tool well is selected to prevent interference with the operation of the legs by the additional material. A cutout 118 is shown in the upper surface plate 110 in FIG. 1 as an example. The actual size, shape and number of cutouts is a matter of design choice, and will vary according to the intended use of the workbench.

Figure 3:
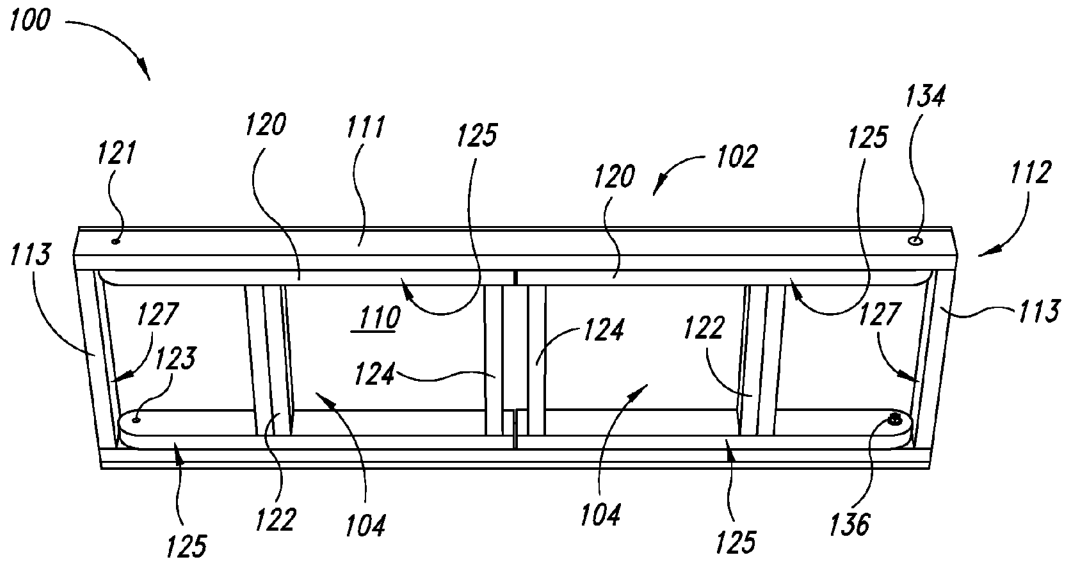

As noted above, the workbench 100 is configured to be assemblable without the use of tools. FIG. 3 shows the bottom side of the benchtop assembly 102 as it appears after the strapping bands are removed. First and second leg assemblies 104 are pivotably attached to the benchtop frame 112 and are folded into the frame, for transport and storage. Each of the leg assemblies 104 comprises a pair of legs 120, a shelf bracket 122, and a crossbar 124. One end of each of the legs 120 is shaped to permit rotation of the leg relative to the benchtop frame 112, as discussed in more detail below, and includes apertures 123 for attachment to the frame. The shelf bracket 122 includes a notch 126 extending lengthwise along an upper surface to receive the shelf assembly 106.

Figure 4:
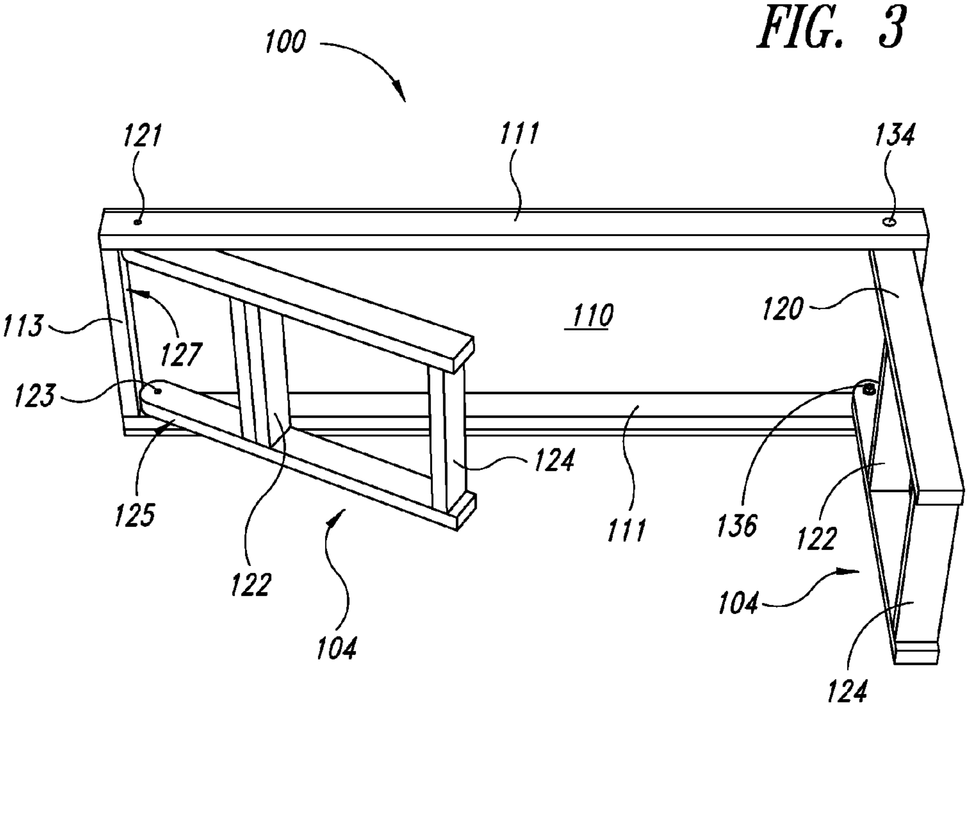

In the pictured embodiment, carriage bolts 134 extend through apertures 121 in the frame 112 and corresponding apertures 123 in respective legs 120 (the apertures 121 and 123 are shown in FIGS. 3 and 4). Washers and nuts 136 are provided on the ends of the carriage bolts 134 to secure the fasteners in place. Other appropriate fasteners can also be used, such as, for example, rivets, rods extending from one side of the frame to the other and traversing the apertures in the legs, etc. According to an embodiment, steel button feet are attached to the bottom ends of the legs 120.

The length of the legs 120 is selected to be less than half the distance between inner surfaces 127 of end rails 111 of the benchtop frame 112, so that the legs can be folded into the benchtop assembly 102.

Figure 5:
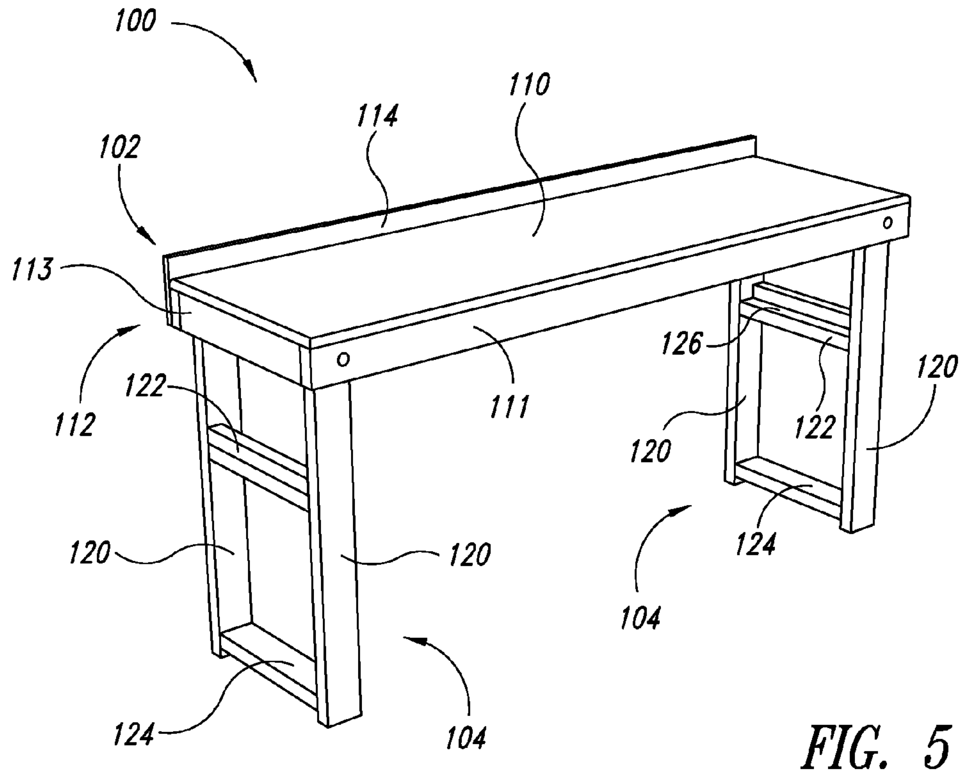

To assemble the workbench 100, the user folds out the first and second leg assemblies, as shown in FIG. 4. The apertures 121, 123 are positioned in the benchtop frame 112 and legs 120, respectively, such that a side surface 125 of each of the legs 120 engages the inner surface 127 of a respective end rail 111 of the frame 112 when the leg assemblies 104 are extended to about a 90 degree angle, relative to a plane defined by the benchtop frame 112, so that the leg assemblies can be extended to approximately 90 degrees, but no further. When both leg assemblies 104 are extended, the user places the benchtop component upright on the legs, as shown in FIG. 5.

Figure 6:
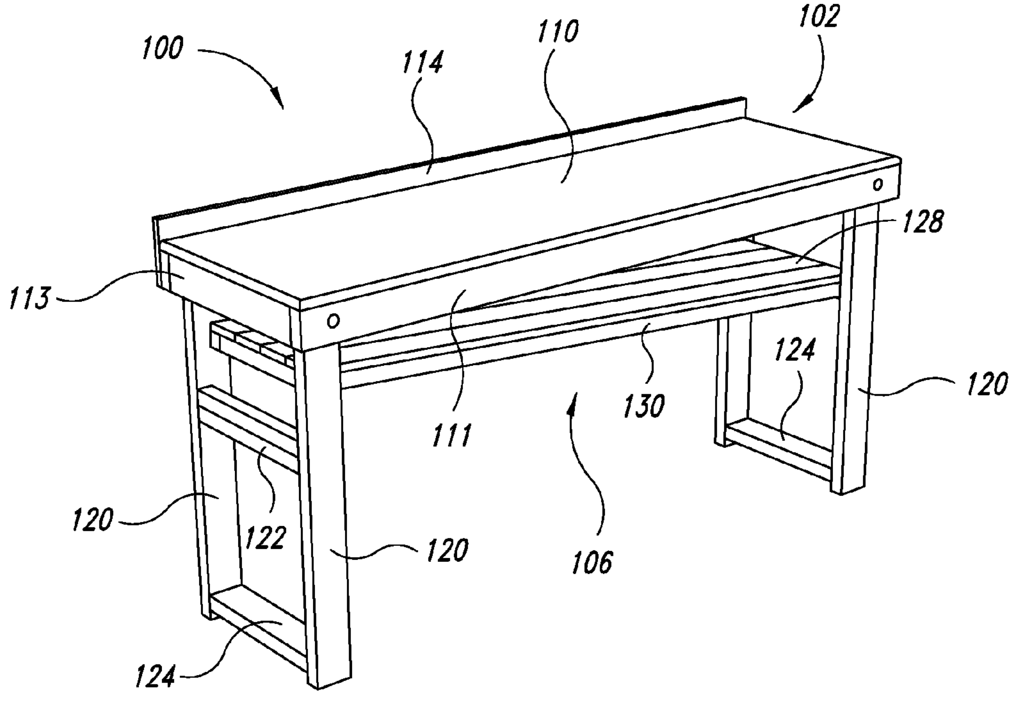

As shown in FIG. 6, the shelf assembly 106 is installed by sliding it between the legs of one of the leg assemblies 104, and by positioning one end in the notch 126 of one of the leg assemblies, then lowering the opposite end of the shelf assembly into the notch 126 of the other of the leg assemblies. The shelf assembly 106 is sized to be held securely by the shelf brackets 122 when the leg assemblies 104 are fully extended, and while the shelf assembly is in place, neither of the leg assemblies can fold into the benchtop frame 112, but instead are held securely extended. The shelf assembly 106 includes a shelf plate 128 and a shelf frame 130. As with the benchtop assembly 102, the shelf plate and shelf frame can be made from a wide variety of materials, as discussed above. The shelf is shown in FIG. 6 with the shelf plate 128 on top of the shelf frame 130. However, the shelf can also be installed with the shelf frame 130 on top of the shelf plate 128, resulting in a tray configuration. This arrangement can be used to prevent small tools or parts from falling from the shelf, or to hold potting vessels, etc.

The fully assembled workbench is shown in FIG. 1. From start to finish, assembly of the workbench can be completed by most adults in under five minutes, without the use of any tools.

Apart from the coupling of the leg assemblies 104 to the benchtop frame 112 and the shelf assembly 106 to the leg assemblies, all the parts are rigidly coupled together, by any suitable means, including, for example, nails, staples, screws, adhesive, etc., all of which are well known in the art.

In the embodiment shown in FIGS. 1-6, the legs 120, crossbars 124, and benchtop frame 112 are made from standard 2×4 lumber, the shelf brackets 122 are each made from one piece of 2×4 and one piece of 2×2 lumber, and the shelf frame is made from 2×2 lumber. The shelf plate 128 is made from 1×4 lumber. The workbench is about six feet long and about 20 inches deep. The length of the legs is about 34 inches long, so that the top of the workbench is about 35 inches high, when assembled. The exact dimensions of the workbench 100 and the individual components will vary according to a number of factors, including intended purpose, strength requirements, and availability of material.

By using lumber in standard dimensions, e.g., 2×4, 2×2, and 1×4, surplus lumber can be used very economically. Typically, lumber is sold on the retail market in lengths of eight, ten, or twelve feet, and, to a very much lesser degree, six feet. Thus, lumber mills that produce lumber for the retail market generally have little use for end cuts of less than six feet in length.

Figure 7:
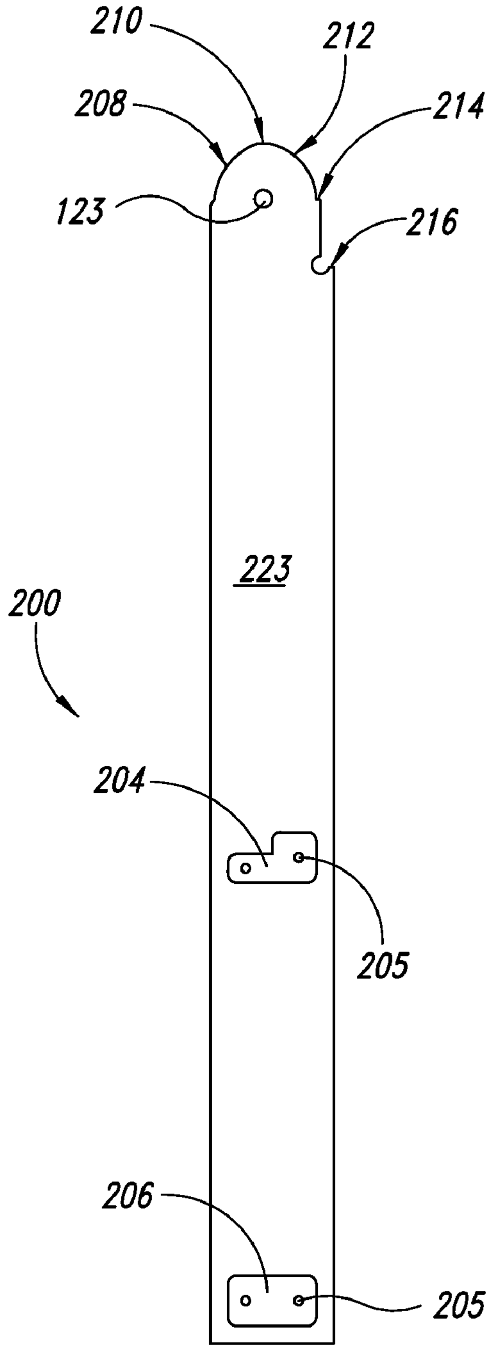
FIG. 7 shows a front elevation view of a bench leg for a foldable workbench according to an alternate embodiment.
Figure 8:
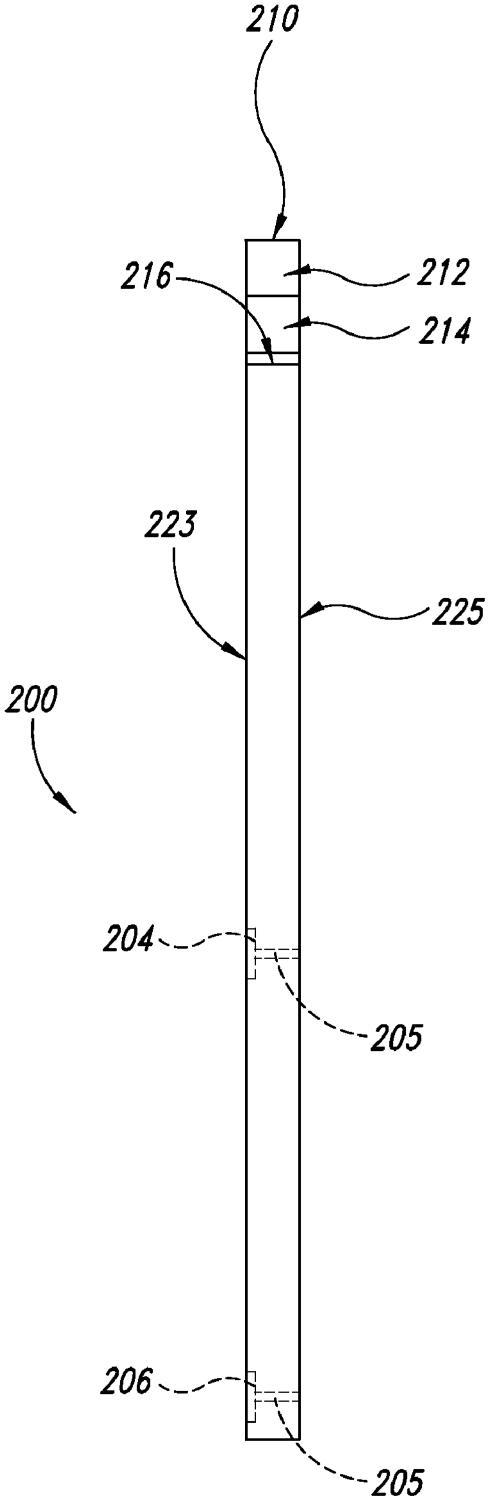
FIG. 8 shows a side elevation view of the bench leg of FIG. 7.

Turning now to FIGS. 7 and 8, a bench leg 200 is shown according to an alternate embodiment. The leg 200 includes an aperture 121 extending through the bench leg from a first surface 223 to a second surface 225, perpendicular to the first and second surfaces, and through which a fastener passes to rotatably couple the leg 200 to a bench top frame such as, for example, the benchtop frame described with reference to FIGS. 1-6. The bench leg 200 also includes a first pocket 204 formed in the first surface 223, configured to receive the end of a shelf bracket, and a second pocket 206 configured to receive a crossbar. Fastener apertures 205 are provided for fastening the shelf bracket and crossbar to the bench leg 200. The upper end of the leg 200 includes first, second, and third cam surfaces 208, 210, and 212, extending between the first and second surfaces 223, 225 of the leg 200, and first and second locking faces 214, 216, also extending between the first and second surfaces 223, 225. The second cam surface 210 is a substantially flat surface lying approximately perpendicular to a longitudinal axis of the leg 200. The second cam surface 210 lies further from a longitudinal axis of the aperture 123 than any portion of the first or third cam surfaces 208, 212. A plane defined by the first locking surface 214 also lies further from the longitudinal axis of the aperture 123 than any portion of the third locking surface 212.

In use, the bench leg 200 is paired with a matching leg that includes all the features shown in FIGS. 7 and 8, arranged in a mirror configuration thereto. A shelf bracket is positioned to extend between the leg 200 and the matching leg with each end received in a respective first pocket 204. Likewise, a crossbar is positioned with each end received in a respective second pocket 206. The shelf bracket and crossbar are securely fastened to the legs by any appropriate means, including by screws traversing the fastener apertures 205 and engaging the respective ends of the shelf bracket and crossbar. The collective assembly of the leg 200, the matching leg, the shelf bracket, and the cross brace is then attached to a benchtop as a leg assembly, as described above.

FIGS. 9A-9D show a portion of a prefabricated foldable workbench 220 according to an embodiment, including a bench leg 200 as described with reference to FIGS. 7 and 8, and a benchtop assembly 224 similar to the benchtop assembly 102 as described with reference to FIGS. 1-6.

Figure 9A:
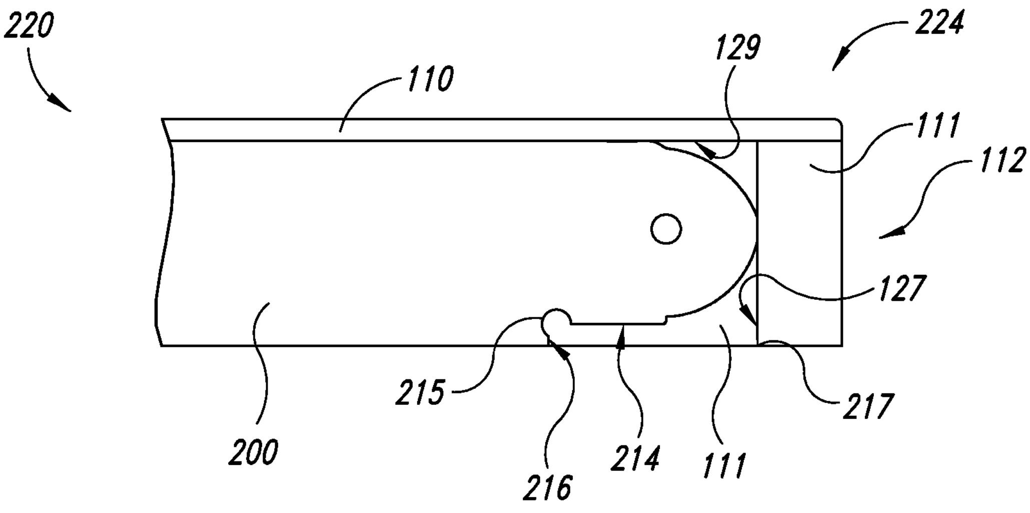
FIGS. 9A-9D show a portion of a prefabricated foldable workbench, with the bench leg of FIGS. 7 and 8 at various positions relative to the benchtop.
Figure 9B:
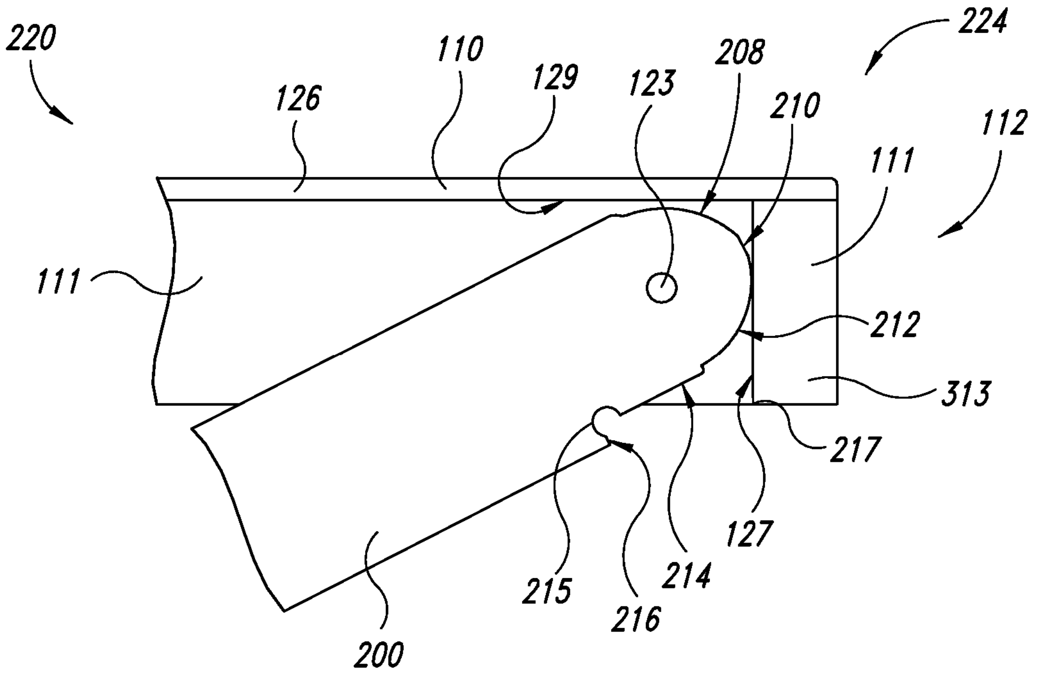
Figure 9C:
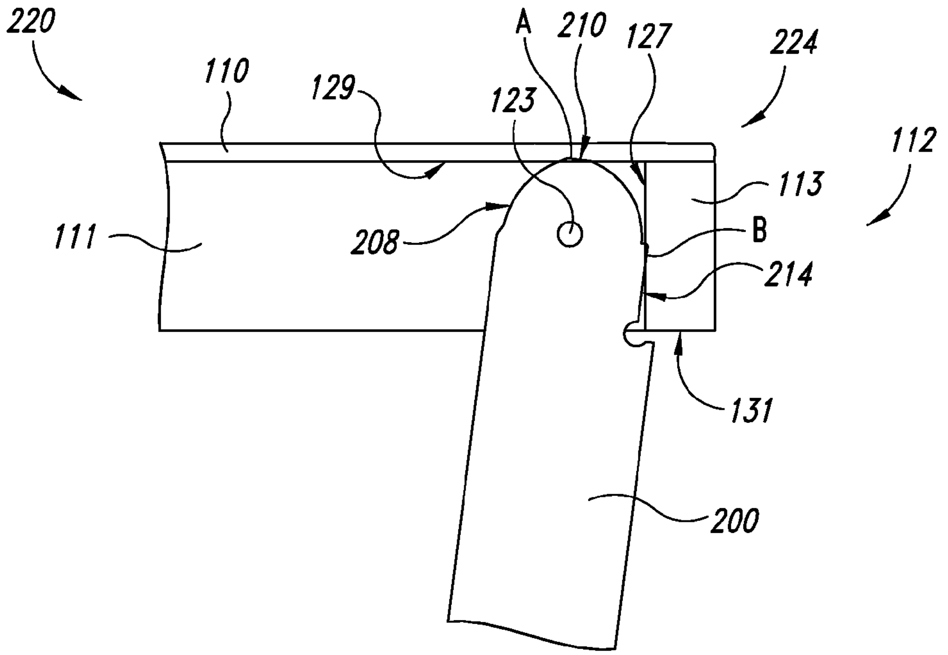
Figure 9D:
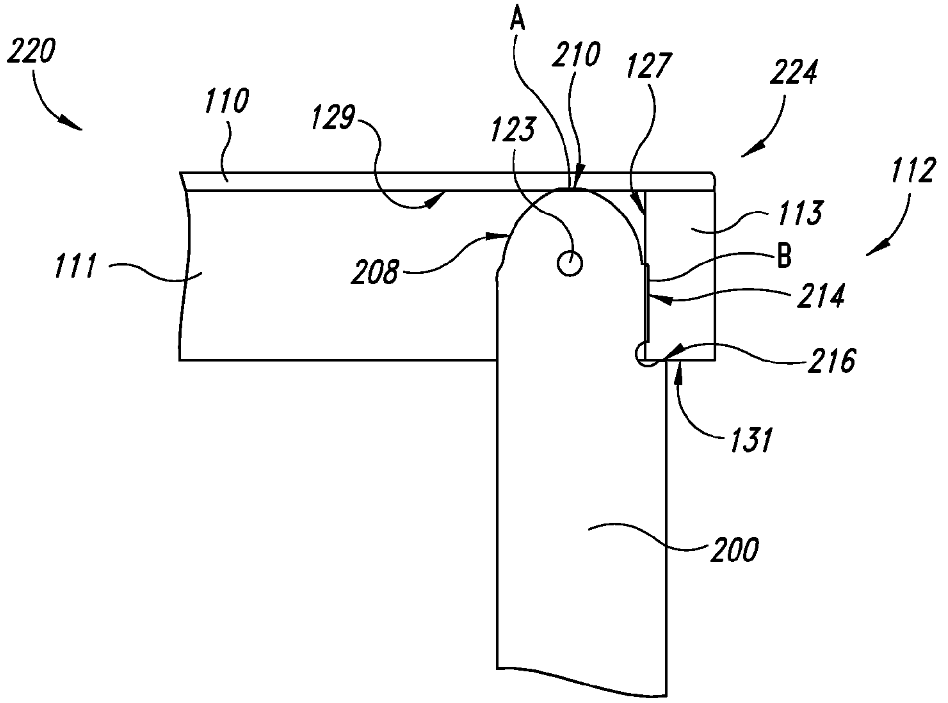

The bench leg 200 is pivotably coupled to the benchtop assembly and configured to rotate through an arc between a folded position, as shown in FIG. 9A, to an open position, as shown in FIG. 9D. The illustrated portion of the benchtop assembly 224 includes an upper surface plate 110 and a benchtop frame 112 comprising an end rail 111 and a side rail 113. The leg 200 is rotatably coupled to the side rail 230 by a fastener, such as a carriage bolt, that extends through the aperture 121 and a corresponding aperture in the side rail 113. While not shown, the fastener is preferably the same or nearly the same diameter as the apertures in the leg 200 and the side rail 113. The aperture in the side rail 113 is positioned, relative to the aperture 121 such that when the leg 200 is folded into the benchtop frame, as shown in FIG. 9A, one side of the leg contacts an inner surface 129 of the upper surface plate 110 and the second cam surface 210 contacts the inner surface 127 of the end rail 111.

Movement of the leg 200 away from the folded position shown in FIG. 9D results in binding of the trailing edge of the second cam surface 210 against the inner surface 127 of the end rail 111, creating resistance to rotation over a small portion of its arc of rotation, and providing a detent that is sufficient to hold the leg in the folded position until a user pulls outward on the leg. The shape of the leg 200 is selected such that, once the leg 200 is rotated a short distance away from the folded position, as shown in FIG. 9B, the cam surfaces 208, 210, 212 clear the inner surface 129 of the benchtop plate 110, and the leg rotates freely.

As the leg 200 approaches a 90 degree position relative to the side rail 113, as shown in FIG. 9C, leading edges of the second cam surface 210 and the locking face 214 begin to bind, respectively, with the inner surface 129 of the upper surface plate 110 at A and the inner surface 127 of the end rail 111 at B. The binding is shown in the drawings as overlapping portions of the respective elements. Because of the shape of the leg 200 and the relative placement of the apertures, the binding is much greater than the binding that occurs while the leg 200 is near the folded position, and more force is required to overcome the resistance. However, by applying more rotational force, the user moves the leg 200 through an arc portion from the position shown in FIG. 9C to the open position shown in FIG. 9D, in which the leg 200 is at or slightly beyond 90 degrees relative to the side rail 113. Through this portion of the arc, the binding between the leg 200 and the benchtop assembly 224 at first increases to a maximum value, then decreases as the leg moves into the open position. In this position, the second cam surface 210 is flat against the inner surface 129 of the upper surface plate 110, the first locking face 214 is flat against the inner surface 127 of the end rail 111, and the second locking face 216 contacts a lower surface 131 of the end rail. In this position, the binding is diminished, but not eliminated. Thus, a detent is provided that holds the leg 200 in the open position. The binding that remains while the leg 200 is in the open position loads the contact areas between the leg, the benchtop assembly 224, and the fastener, which provides a secure and stable connection between the leg and the benchtop assembly.

In the manufacturing process, the leg 200 may be shaped by a rotating cutting tool, such as, for example, a router, which will have some selected radius. If the radius of the cutting tool is greater than a radius of a corner 217 of the end rail 111, contact between the corner of the end rail and the leg 200 can occur before the leg reaches the open position, resisting movement of the leg to the open position. To prevent such contact, an enlarged radius 215 is provided between the first and second locking faces 214, 216. Thus, even if the corner 217 of the end rail 111 is perfectly square, no contact will occur.

The leg 200 and benchtop frame 112 of the embodiment of FIGS. 7-9D are preferably made from a relatively soft wood such as hemlock or pine, which is somewhat compressible. Accordingly, the shape of the end of the leg 200 is selected to create a significant amount of binding in order to produce a secure detent in the open position. If the material of the leg and benchtop were a harder material, this degree of binding might prevent movement of the leg into the open position. Thus, in embodiments that employ harder material, the shape of the legs and/or relative positions of the apertures of the leg and side rail are modified accordingly, to provide sufficient binding for a secure detent without damaging the workbench or rendering movement of the leg into the open position exceedingly difficult or impossible.

By adjusting the tension of the fastener by which the bench leg 200 is coupled to the benchtop assembly 224, overall resistance to rotation of the leg can be modified. However, for the purposes of the disclosure and claims, this resistance is ignored. Thus, where the leg is described as freely rotating, this merely means that there is no binding at the position described, such as would introduce resistance to rotation.

While the leg 200 has been described for use as part of a leg assembly that incorporates a pair of legs, similar to the leg assemblies 104 described with reference to FIGS. 1-6, it will be recognized that embodiments of the leg 200 can be used with many structures that require folding legs, without necessarily being combined as part of a leg assembly.

Figure 10:
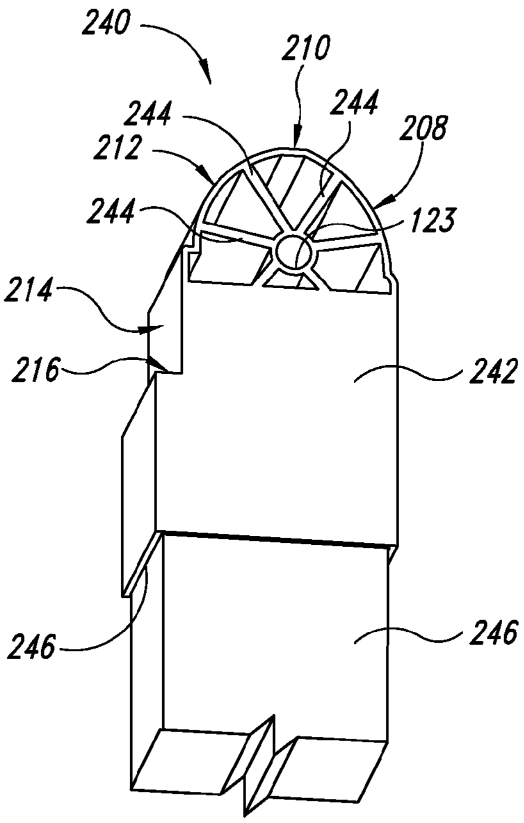
FIGS. 10 and 11 show perspective views of bench legs, according to respective embodiments, each of which includes a plastic insert for coupling the bench leg to a foldable workbench.

Turning now to FIG. 10, a portion of a bench leg 240 for a folding workbench is shown, according to another embodiment. The bench leg 240 includes an injection-molded plastic end-cap that incorporates features described with reference to the bench leg 200 of FIGS. 7-9D, and that are therefore identified with identical reference characters. The end-cap 242 includes stiffening webs 244 and a socket 246 that is sized to receive a leg piece 248 having, preferably, a standard lumber dimension such as, for example, 2×4, and cut to a selected length. A user simply inserts the leg piece 248 into the socket 246 to form the leg 240. The socket 246 can be configured to fit tightly to the leg piece 248, or, alternatively, the user can attach the end-cap 242 to the leg piece 248 using any appropriate fastening method, such as, e.g., screws or adhesive. Operation of the leg 240 is substantially identical to the operation of the leg 200 described with reference to FIGS. 9A-9D.

Figure 11:
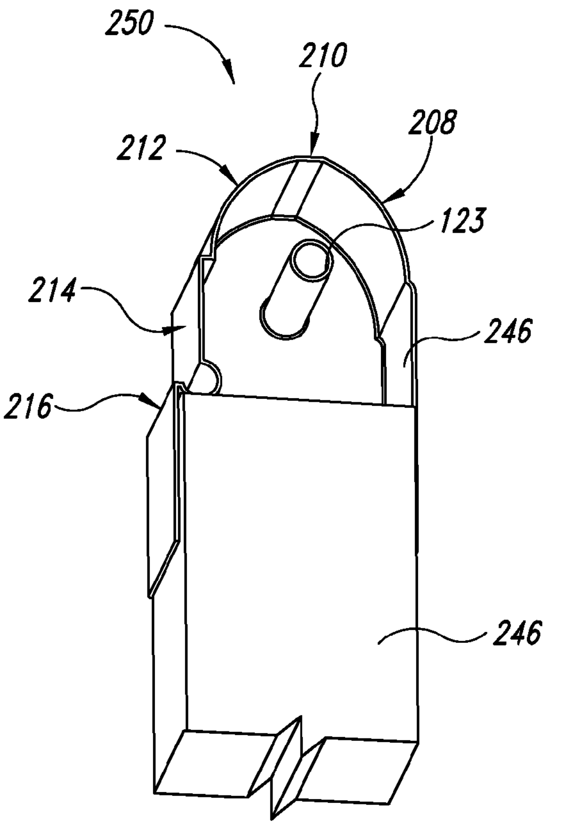

FIG. 11 shows a portion of a bench leg 250 for a folding workbench according to a further embodiment. As with the bench leg 240 described with reference to FIG. 10, the bench leg 250 comprises an injection molded end cap 252 and a leg piece 244. Coupled thereto by an appropriate method. The end cap 252 likewise includes features described with reference to the bench leg 200 of FIGS. 7-9D, identified with identical reference characters. Operation of the leg 250 is substantially identical to that of legs 200 and 240.

Ordinal numbers, e.g., first, second, third, etc., are used in the claims merely for the purpose of clearly distinguishing between claimed elements or features thereof. The use of such numbers does not suggest any other relationship, e.g., order of operation or relative position of such elements. Furthermore, ordinal numbers used in the claims have no specific correspondence to those used in the specification to refer to elements of disclosed embodiments on which those claims read.

The abstract of the present disclosure is provided as a brief outline of some of the principles of the invention according to one embodiment, and is not intended as a complete or definitive description of any embodiment thereof, nor should it be relied upon to define terms used in the specification or claims. The abstract does not limit the scope of the claims.

Elements of the various embodiments described above can be omitted or combined, and further modifications can be made, to provide further embodiments without deviating from the spirit and scope of the invention. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification, but should be construed to include all possible embodiments along with the full scope of equivalents to which such claims are entitled. Accordingly, the claims are not limited by the disclosure.

The invention claimed is:

1. A leg for a workbench, comprising:

an aperture positioned near a first end of the leg and extending between a first side of the leg and a second side of the leg and perpendicular to a longitudinal axis of the leg;

a first cam surface extending between the first and second sides of the leg;

a second, flat cam surface extending between the first and second sides of the leg and adjacent to the first cam surface, the second cam surface lying farther from a longitudinal axis of the aperture than any portion of the first cam surface;

a third cam surface extending between the first and second sides of the leg and adjacent to the second cam surface, the third cam surface lying closer to the longitudinal axis of the aperture than any portion of the second cam surface; and a first locking surface extending between the first and second sides of the leg and adjacent to the third cam surface, the first locking surface defining a first plane that is substantially parallel to the longitudinal axes of the leg and the aperture, and lying farther from the longitudinal axis of the aperture than any portion of the third cam surface, the second cam surface defining a second plane lying perpendicular to the first plane.

2. The leg of claim 1, comprising a second locking surface lying substantially adjacent to and perpendicular to the first locking surface.

3. The leg of claim 1, comprising a pocket formed in the first side thereof, configured to receive a crossbar.

4. The leg of claim 1, comprising an end cap that includes the aperture, the first, second, and third cam surfaces, and the first locking surface.

5. The leg of claim 4 wherein the end cap comprises a socket having a rectangular opening that extends parallel to the longitudinal axis of the leg.

6. The leg of claim 5, comprising a leg piece, a first end thereof positioned within the socket.

7. The leg of claim 4, comprising a second locking surface lying substantially adjacent to and perpendicular to the first locking surface.

* * * * *